(12) United States Patent
Thakkar et al.

(10) Patent No.: US 11,567,239 B2
(45) Date of Patent: Jan. 31, 2023

(54) POLYURETHANE LAYER FOR A LIGHT DIRECTING ARTICLE

(71) Applicant: 3M INNOVATIVE PROPERTIES COMPANY, St. Paul, MN (US)

(72) Inventors: Bimal V. Thakkar, Saint Paul, MN (US); Jay M. Jennen, Forest Lake, MN (US); Robert D. Hamann, Eagan, MN (US); Ryan M. Braun, Saint Paul, MN (US); Robert F. Watkins, White Bear Lake, MN (US); Joseph D. Rule, Woodbury, MN (US); Todd D. Jones, Saint Paul, MN (US); Charlie C. Ho, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 232 days.

(21) Appl. No.: 17/114,821

(22) Filed: Dec. 8, 2020

(65) Prior Publication Data
US 2021/0088695 A1 Mar. 25, 2021

Related U.S. Application Data

(63) Continuation of application No. 15/742,322, filed as application No. PCT/US2016/039297 on Jun. 24, 2016, now Pat. No. 10,884,163.
(Continued)

(51) Int. Cl.
*G02B 26/08* (2006.01)
*G02B 1/14* (2015.01)
(Continued)

(52) U.S. Cl.
CPC .................. *G02B 1/14* (2015.01); *C08J 5/18* (2013.01); *G02B 5/12* (2013.01); *G02B 5/124* (2013.01);
(Continued)

(58) Field of Classification Search
CPC . G02B 1/14; G02B 5/12; G02B 5/124; G02B 26/0825; C08J 5/18; C08J 2375/06
(Continued)

(56) References Cited

U.S. PATENT DOCUMENTS 2,407,680 A 9/1946 Palmquist
3,684,348 A 8/1972 Rowland
(Continued)

FOREIGN PATENT DOCUMENTS

CN 203519858 U 4/2014
EP 0972215 1/2000
(Continued)

OTHER PUBLICATIONS

Macosko, "A New Derivation of Average Molecular Weights of Nonlinear Polymers", Macromolecules, 1976, vol. 09, No. 02, pp. 199-206.
(Continued)

*Primary Examiner* — Euncha P Cherry
(74) *Attorney, Agent, or Firm* — Jeffrey M. Olofson

(57) ABSTRACT

The disclosed aliphatic thermoplastic polyurethane composition is well suited for use in thin, flexible light directing articles to impart flexibility, toughness, or protection to the light directing articles that contain optically active elements. The disclosed aliphatic thermoplastic polyurethanes have improved thermostability at higher temperatures. Specifically, the disclosed aliphatic thermoplastic polyurethanes have a cross-over temperature greater than 110° C. In one embodiment, the cross-over temperature is greater than 130° C. In one embodiment, the cross-over temperature is less than 170° C. and a Tg greater than 35° C. and less than 70° C.

15 Claims, 2 Drawing Sheets

Related U.S. Application Data

(60) Provisional application No. 62/189,474, filed on Jul. 7, 2015.

(51) Int. Cl.
*G02B 5/124* (2006.01)
*G02B 5/12* (2006.01)
*C08J 5/18* (2006.01)

(52) U.S. Cl.
CPC ....... *G02B 26/0825* (2013.01); *C08J 2375/06* (2013.01)

(58) Field of Classification Search
USPC .................................. 359/529–533
See application file for complete search history.

(56) References Cited

U.S. PATENT DOCUMENTS

| | | |
|---|---|---|
| 3,689,346 A | 9/1972 | Rowland |
| 3,712,706 A | 1/1973 | Stamm |
| 3,811,983 A | 3/1974 | Rowland |
| 4,202,600 A | 5/1980 | Burke |
| 4,243,618 A | 1/1981 | Van Arnam |
| 4,332,847 A | 6/1982 | Rowland |
| 4,576,850 A | 3/1986 | Martens |
| 4,588,258 A | 5/1986 | Hoopman |
| 4,601,861 A | 7/1986 | Pricone |
| 4,775,219 A | 10/1988 | Appledorn |
| 4,938,563 A | 7/1990 | Nelson |
| 5,156,863 A | 10/1992 | Pricone |
| 5,450,235 A | 9/1995 | Smith |
| 5,491,586 A | 2/1996 | Phillips |
| 5,514,441 A | 5/1996 | Pohto |
| 5,614,286 A | 3/1997 | Bacon, Jr. |
| 5,642,222 A | 6/1997 | Phillips |
| 5,691,845 A | 11/1997 | Iwatsuka |
| 5,691,846 A * | 11/1997 | Benson, Jr. ............ G02B 5/124 359/530 |
| 5,691,856 A | 11/1997 | Kardash |
| 5,763,049 A | 6/1998 | Frey |
| 5,784,197 A | 7/1998 | Frey |
| 6,054,208 A | 4/2000 | Rega |
| 6,318,867 B1 | 11/2001 | Bacon, Jr. |
| 6,676,261 B2 | 1/2004 | Mullen |
| 7,188,960 B2 | 3/2007 | Smith |
| 7,611,251 B2 | 11/2009 | Thakkar |
| 8,128,779 B2 | 3/2012 | Ho |
| 2013/0034682 A1 | 2/2013 | Free |
| 2013/0135731 A1 | 5/2013 | Smith |
| 2017/0218226 A1 | 8/2017 | Ho |

FOREIGN PATENT DOCUMENTS

| | | |
|---|---|---|
| JP | H09-212115 | 8/1997 |
| JP | H10-111660 | 4/1998 |
| JP | H10-259304 | 9/1998 |
| JP | 11-512354 | 10/1999 |
| JP | H11-512494 | 10/1999 |
| JP | 2000-509165 | 7/2000 |
| JP | 2000-509166 | 7/2000 |
| JP | 2000-328040 | 11/2000 |
| JP | 2001-527222 | 12/2001 |
| JP | 2009-534709 | 9/2009 |
| JP | 2012-521478 | 9/2012 |
| JP | 2014-524986 | 9/2014 |
| JP | 2016-118584 | 6/2016 |
| WO | WO 97/10279 | 3/1997 |
| WO | WO 1998-45735 | 10/1998 |
| WO | WO 2002-23232 | 3/2000 |
| WO | WO 2004/041899 | 5/2004 |
| WO | WO 2011-129832 | 10/2011 |
| WO | WO 2016-018749 | 2/2016 |

OTHER PUBLICATIONS

Miller, "A New Derivation of Post Gel Properties of Network Polymers", Macromolecules, 1976, vol. 09, No. 02, pp. 206-211.
International Search Report for PCT International Application No. PCT/US2016/039297, dated Sep. 15, 2016, 4 pages.

* cited by examiner

POLYURETHANE LAYER FOR A LIGHT DIRECTING ARTICLE

CROSS REFERENCE TO RELATED APPLICATIONS

This application is a continuation of U.S. application Ser. No. 15/742,322, filed Jan. 5, 2018, now pending, which is a national stage filing under 35 U.S.C. 371 of PCT/US2016/039297, filed Jun. 24, 2016, which claims priority to U.S. Provisional Application No. 62/189,474, filed Jul. 7, 2015. All application mentioned in this paragraph are hereby incorporated by reference.

FIELD

The present disclosure relates to an aliphatic polyurethane layer for a light directing article.

BACKGROUND

Light directing articles have an ability to manipulate incoming light. Light directing films and sheeting typically include an optically active portion that may be microstructured prisms or beads.

Light directing articles may allow portions of light to pass through the substrate in a controlled manner, such as light directing window film or multilayer optical film. In these types of light directing articles the optically active portion typically is a microstructured prism.

Light directing articles may redirect incident light towards its originating source, and are referred to as retroreflective articles. The ability to retroreflect light has led to the wide-spread use of retroreflective sheetings on a variety of articles. For retroreflective articles, the optically active portion typically is either a bead or a microstructured prism that is a cube-corner. Beaded sheeting employs a multitude of glass or ceramic microspheres to retroreflect incident light. Cube-corner sheeting, on the other hand, typically employs a multitude of rigid, interconnected, cube-corner elements to retroreflect incident light. U.S. Pat. No. 2,407,680 shows and example of a beaded retroreflective sheeting, and U.S. Pat. No. 5,450,235 shows and example of a cub-corner retroreflective sheeting.

A specular reflective coating such as a metallic coating can be placed on the backside of the cube-corner elements to promote retroreflection. In addition to or in lieu of a metallic coating, a seal film can be applied to the backside of the cube-corner elements. The sealing film maintains an air interface at the backside of the cubes to enhance retroreflectivity. Various sealing films suitable for use with flexible retroreflective sheeting have been described. See for example U.S. Pat. Nos. 5,784,197; 5,691,846; and 6,318,867.

Flexible light directing articles, such as retroreflective sheeting, are particularly well-suited for use on irregular surfaces or for attachment to flexible substrates such as a traffic cones and barrels. Further, light directing articles are used in rugged conditions, such as outdoor use. It is important to protect the outer exposed surface of the light directing article because damage to the underlying optically active area can reduce or eliminate the optical function.

Polyurethane films have been used to protect sheeting due to its abrasion resistance, toughness, flexibility, impact resistance, tear strength, and chemical resistance. Chemically, polyurethanes are distinguished by their characteristic carbamate (—NH—CO—O—) linkages and are generally prepared by reacting a polyisocyanate with a polyol in the presence of a catalyst. There are two general types of polyurethanes, thermoset and thermoplastic. Thermoset polyurethanes are highly crosslinked by covalent bonds. Thermoplastic polyurethanes are characterized by linear polymeric chains having self-ordering block structures that are generally uncrosslinked. The block structures of a thermoplastic polyurethane generally include alternating "hard" and "soft" segments covalently bonded to each other end-to-end. The hard segments aggregate to form crystalline or pseudo-crystalline regions that act like physical crosslinks at ambient temperatures, but convert to a molten state upon heating. As a result, thermoplastic polyurethanes are well suited for thermoforming onto three dimensional articles and can be easily reprocessed. However, in some applications the resulting melting of thermoplastic polyurethanes is undesirable.

SUMMARY

The disclosed aliphatic thermoplastic polyurethane composition is well suited for use in thin, flexible light directing articles to impart flexibility, toughness, or protection to the light directing articles that contain optically active elements. The disclosed aliphatic thermoplastic polyurethanes have improved thermostability at higher temperatures. Specifically, the disclosed aliphatic thermoplastic polyurethanes have a cross-over temperature greater than 110° C. In one embodiment, the cross-over temperature is greater than 130° C. In one embodiment, the cross-over temperature is less than 170° C. Cross-over temperature can be: (1) the temperature at which the material transitions from the rubbery region to the flow region, (2) when G' (storage modulus)=G" (loss modulus), or (3) when tan delta=G"/G'=1.

Some light directing articles are manufactured using high temperature, high pressure, or both conditions. Further, in extreme weather conditions, light directing articles can be exposed to very high temperatures over extended periods of time. Therefore, a linear, non-branched, thermoplastic polyurethane film is likely to have a cross-over temperature too low and will therefore soften and even flow during manufacturing or during use. However, use of highly crosslinked thermoset polyurethane films are undesirable because they are too stiff and rigid.

The disclosed aliphatic thermoplastic polyurethane film for the body layer on a light directing article has a cross-over temperature sufficiently high that it is able to withstand higher temperatures during processing and use without softening and flowing as compared to linear, non-branched thermoplastic polyurethanes. Also, the disclosed aliphatic thermoplastic polyurethane film is not highly crosslinked to be considered a thermoset material, and therefore will remain flexible.

In one embodiment, the light directing article comprises a plurality of optically active elements and a body layer adjacent to the plurality of optically active elements. The body layer comprises an aliphatic thermoplastic polyurethane that has a cross-over temperature greater than 110° C. and less than 170° C. and a Tg greater than 35° C. and less than 70° C. In one embodiment, the cross-over temperature is greater than 130° C. In one embodiment, the cross-over temperature is greater than 140° C.

DEFINITIONS

Figure 1:
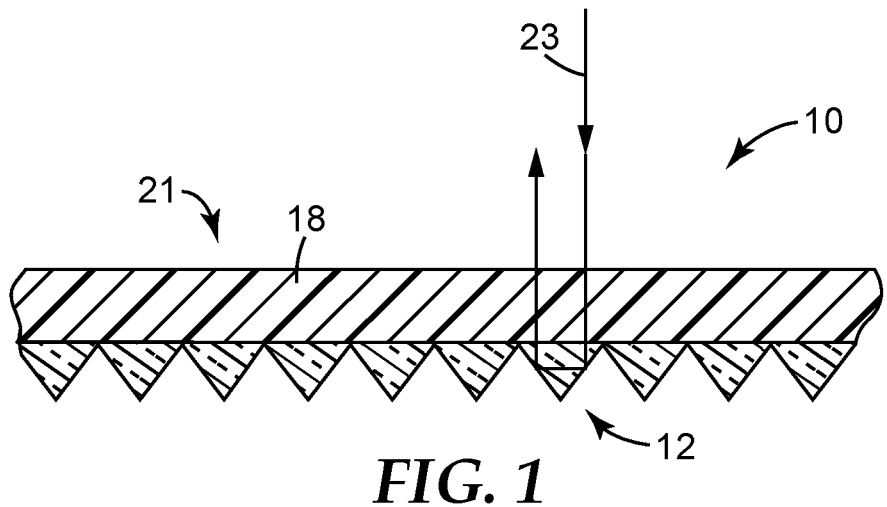
FIG. 1 is a side sectional view of one embodiment of a cube corner sheeting.

As used herein:

"ambient conditions" means at a temperature of 25 degrees Celsius and a pressure of 1 atmosphere (approximately 100 kilopascals);

"catalyst" means a substance that can increase the speed of a chemical reaction;

"diol" means a compound having a hydroxyl functionality of exactly two;

"diisocyanate" means a compound having an isocyanate functionality of exactly two;

"elastic modulus" means the elastic modulus determined according to ASTM D882-75b using Static Weighing Method A with a 12.5 centimeter (5 inch) initial grip separation, a 2.5 centimeter (1 inch) sample width, and a 2.5 centimeter/minute (1 inch/minute) rate of grip separation.

"harden" means to alter the physical state and or chemical state of the composition to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;

"hardenable" means capable of being hardened;

"long-chain polyol" means a polyol having a molecular weight of greater than 185 g/mol.

"microstructure" as used herein as defined and explained in U.S. Pat. No. 4,576,850, the disclosure of which is herein incorporated by reference. Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005+/−0.1 or, preferably, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner;

"multifunctional isocyanate" means a compound having an isocyanate functionality of more than two;

"multifunctional polyol" means a compound having a hydroxyl functionality of more than two.

"polyisocyanate" means a compound having an isocyanate functionality of two or more, and includes multifunctional isocyanate and diisocyanate;

"polyol" means a compound having a hydroxyl functionality of two or more, and includes multifunctional polyol and diol;

"sheeting" mean a thin piece of material;

"short-chain polyol" means a polyol having a molecular weight of at most 185 g/mol.

DETAILED DESCRIPTION

The disclosed light directing article 10 comprises optically active elements 12 and a body layer 18 adjacent to the optically active elements 12. In some embodiments, the optically active elements 12 are a plurality of beads. In some embodiments, the optically active elements 12 are a plurality of microstructures. The microstructures can include prisms. In one embodiment, the microstructures can include cube corners. In some embodiments, the light directing article comprises additional layers, such as printing, protection, primer, or adhesive layers adjacent to the optically active elements 12 or body layer 18 or between the optically active elements 12 and body layer 18.

The body layer 18 comprises an aliphatic thermoplastic polyurethane, described in more detail below. In some embodiment, one or more of the additional layers included in the light directing article 10 comprises the disclosed aliphatic thermoplastic polyurethane.

Examples of light directing article constructions comprising the disclosed aliphatic thermoplastic polyurethane layer are described below. It is understood that descriptions might be with respect to retroreflective sheeting, but the general descriptions apply to other light directing articles.

FIG. 1 shows one embodiment of a microstructured light directing sheeting 10 that comprises a multitude of prism elements 12 and a body layer 18. Body layer 18 may also be referred to as an overlay film, protection layer, as well as a base substrate. Body layer 18 typically has a thickness of at least 20 micrometers and more typically at least 50 micrometer. Body layer 18 usually has a thickness less than 1,000 micrometer, and typically no greater than 250 micrometers. The prism elements 12 project from a first, typically rear side of body layer 18.

The prism elements 12 and body layer 18 are typically formed from a light transmissive polymeric material. This means that the polymer is able to transmit at least 70 percent of the intensity of the light incident upon it at a given wavelength. More preferably, the polymers that are used for retroreflective sheeting have a light transmissibility of greater than 80 percent, and more preferably greater than 90 percent. In one embodiment, the body layer 18 is transparent. When the light directing sheeting 10 is employed for uses other than traffic safety, such as advertising displays, the light transmissibility may be as low as 5 to 10 percent.

In one embodiment, the body layer 18 is the outermost layer on the front side of the sheeting 10. As shown in FIG. 1, for a retroreflective sheeting, the prism elements 12 are cube-corners and the light enters the light directing sheeting 10 through the front surface 21. The light then passes through the body portion 18 and strikes the planar faces of the cube-corner elements 12 and returns in the direction from which it came as shown by arrow 23. The body layer 18 functions to protect the sheeting from outdoor environmental elements and/or provides mechanical integrity to the sheeting.

The microstructured light directing sheeting may optionally include a land layer 16 such as shown in U.S. Pat. No. 5,450,235, and shown in FIG. 5. In some embodiments, the land layer is integral with the microstructured elements meaning that the land and cubes are formed from a single polymeric material—not two different polymeric layers subsequently united together. Particularly for embodiments where the sheeting is flexible, the land layer 16, typically, has a thickness in the range of about 0 to 150 micrometers, and preferably in the range of approximately about 1 to 100 micrometers. The thickness of the land is preferably no greater than 10 percent of the height of the prism elements, and more preferably about 1 to 5 percent thereof. In sheetings having thicker land portions, it is typically more difficult to achieve decoupling of individual prism elements.

The prism elements 12 typically have a height in the range of about 20 to 500 micrometers, and more typically in the range of about 35 to 100 micrometers. Although the embodiment of the invention shown in FIG. 1 has a single body layer 18, there may be more than one body layer 18.

Figure 2:
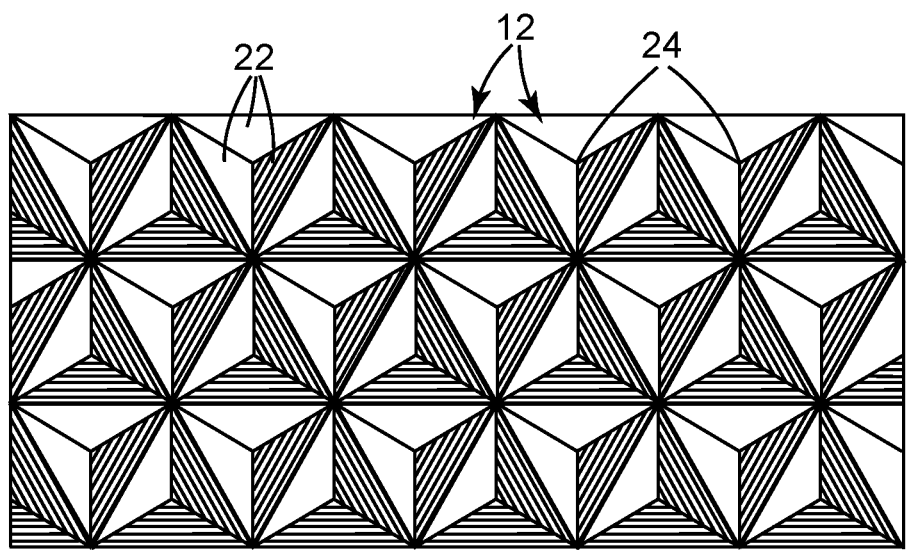
FIG. 2 is a side sectional view of another embodiment of a cube corner sheeting.

FIG. 2 illustrates a perspective view of one embodiment of a cube-corner element surface which is typically the back side of a retroreflective article. As shown, the cube-corner elements 12 are disposed as matched pairs in an array on one side of the sheeting. Each cube-corner element 12 has the shape of a trihedral prism with three exposed planar faces 22. The planar faces 22 may be substantially perpendicular to one another (as in the corner of a room) with the apex 24 of the prism vertically aligned with the center of the base. The angle between the faces 22 typically is the same for each cube-corner element in the array and will be about 90 degrees. The angle, however, can deviate from 90 degrees as is well-known. See, for example, U.S. Pat. No. 4,775,219 to Appledorn et al., the disclosure of which is herein incorporated by reference. The apex 24 of each cube-corner element 12 may be vertically aligned with the center of the base of the cube-corner element, see, for example, U.S. Pat. No. 3,684,348. The apex also may be canted to the center of the base as disclosed in U.S. Pat. No. 4,588,258. The present light directing article is not limited to any particular cube-corner geometry. Various cube-corner configurations are known such as described in U.S. Pat. Nos. 7,188,960; 4,938,563; 4,775,219; 4,588,258; 4,243,618; 4,202,600; and 3,712,706, the disclosures of which are herein incorporated by reference.

Figure 3:
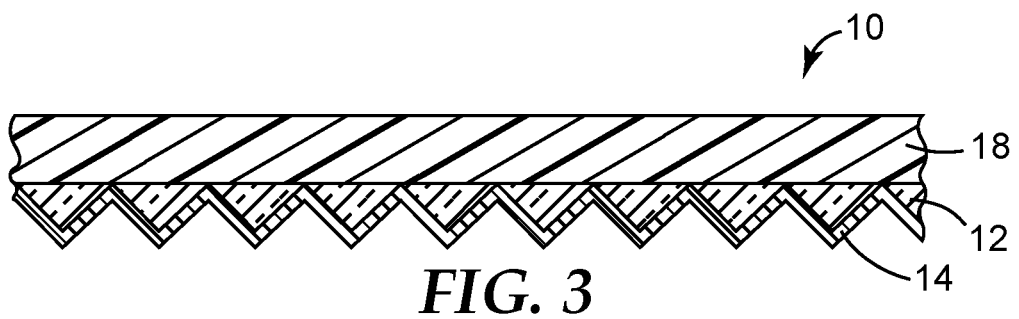
FIG. 3 is a side sectional view of another embodiment of a cube corner sheeting.
Figure 4:
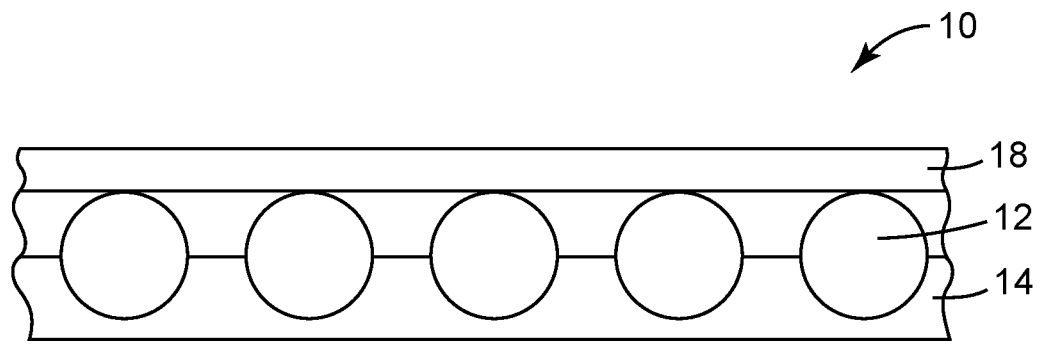
FIG. 4 is a side sectional view of one embodiment of a beaded sheeting.

FIGS. 3 and 4 show embodiments of a microstructured article 10 with optical elements 12 and a specular reflective layer 14. In FIG. 3, the optical elements 12 are microstructured cube-corner elements. In FIG. 4, the optical elements 12 are beads. A specular reflective coating 14 such as a metallic coating can be placed on the backside of the optical elements 12 to promote retroreflection. The metallic coating can be applied by known techniques such as vapor depositing or chemically depositing a metal such as aluminum, silver, or nickel. A primer layer may be applied to the backside of the cube-corner elements to promote the adherence of the metallic coating.

Figure 5:
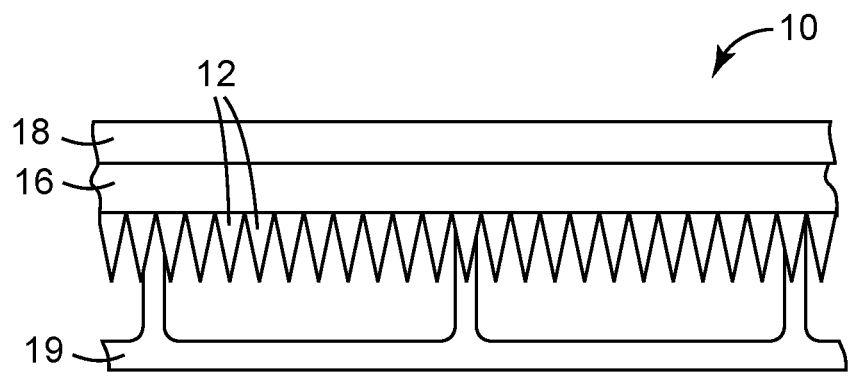
FIG. 5 is a side sectional view of another embodiment of a cube corner sheeting.

FIG. 5 shows an embodiment of a microstructured article 10 with a seal film 19. In addition to or in lieu of a specular reflective layer, a seal film 19 can be applied to the backside of the cube-corner elements 12; see, for example, U.S. Pat. Nos. 5,691,846; 5,784,197; and 6,318,867, the disclosure of which are herein incorporated by reference. The seal film 19 maintains an air interface at the backside of the cubes to enhance retroreflectivity.

For embodiments shown in FIGS. 1-5, an adhesive layer 20 (see FIG. 6), possibly covered with a removable release liner, can be included so that the microstructured article 10 can be secured to a substrate, such as a sign, license plate, window, or other display.

Figure 6:
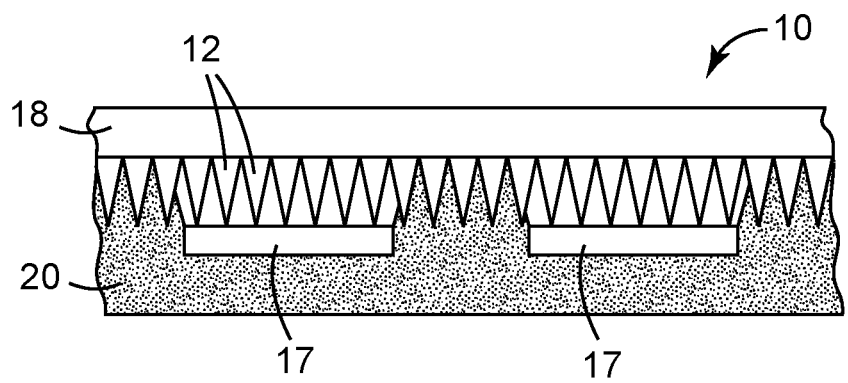
FIG. 6 is a side sectional view of another embodiment of a cube corner sheeting.

FIG. 6 shows an embodiment of a microstructured article 10 with barrier layers 17 on a pressure sensitive adhesive 20. The pressure sensitive adhesive 20 incorporates into the prism elements 12 in the area surrounding the barrier layers 17, while the barrier layers 17 prevent the underlying adhesive from making contact with the prism elements 12 to maintain an air interface at the backside of the adjacent prism elements 12 for creating a refractive index differential. The pressure sensitive adhesive 20 is able to secure the article 10 to a substrate, such as a sign, license plate, window, or other display. Further disclosure of barrier layer constructions can be found in U.S. Patent Application Publications U 2013/0034682 and 2013/0135731, herein incorporated by reference.

The microstructured elements tend to be hard and rigid. The polymeric composition used to make the microstructured elements may be thermoplastic, yet is preferably a reaction product of a polymerizable resin with multi-functionality that lead to cross-linking. The elastic modulus of the composition of the microstructured elements in one embodiment is greater than $16 \times 10^8$ pascals, in one embodiment is greater than $18 \times 10^8$ pascals, and in one embodiment is greater than $25 \times 10^8$ pascals.

For embodiments wherein the microstructured article is flexible, the body layer comprises a low elastic modulus polymer for easy bending, curling, flexing, conforming, or stretching. The disclosed aliphatic thermoplastic polyurethane have a Tg that is near room temperature, so the modulus varies strongly with temperature. Because of their toughness, urethanes in general can be considered to have a higher modulus while still being flexible. In one embodiment, the body layer typically has an elastic modulus at 25° C. of less than $18 \times 10^8$ pascals. In one embodiment, the elastic modulus at 25° C. may be less than $13 \times 10^8$ pascals, less than $5 \times 10^8$ pascals, or less than $3 \times 10^8$ pascals. In one embodiment, the body layer has a glass transition temperature that is less than 75° C. Preferred polymeric materials used in the body layer are resistant to degradation by UV light radiation so that the retroreflective sheeting can be used for long-term outdoor applications.

The resin composition (and process conditions) of the microstructured elements is preferably chosen such that the resin is capable of penetrating the overlay film, or body layer, and then cured in situ or otherwise solidified, such that after curing, an interpenetrating network between the material of the microstructured elements and the material of the overlay film is formed, as described in U.S. Pat. No. 5,691,856, herein incorporated by reference.

During curing or solidification of the microstructured element composition, depending on the composition of the cube corner material, individual microstructured elements may experience a certain degree of shrinking. If the elastic modulus of the overlay film is too high, torsional stresses can be applied to the microstructured elements if they shrink during curing. If the stresses are sufficiently high, then the microstructured elements can become distorted with a resulting degradation in optical performance. When the elastic modulus of the overlay film is sufficiently lower than the modulus of the microstructured element material, the overlay film can deform along with the shrinking of microstructured elements without exerting such deformational stresses on the cube corner elements that would lead to undesirable degradation of the optical characteristics.

Thermoplastic compositions employed for forming the microstructured elements typically have a low linear mold shrinkage, i.e., less than 1 percent. As described in U.S. Pat. No. 5,691,845, the cube corner polymerizable resin compositions typically shrink upon curing. Typically, the resin will shrink at least 5 percent by volume when cured, more preferably between 5 and 20 percent by volume, when cured. The use of resin compositions that shrink is amenable to obtaining minimal thickness to the land 16.

In general, the modulus differential between the body layer and the microstructured elements is typically on the order of 1.0 to $1.5 \times 10^7$ pascals or more. As the height of the microstructured elements diminishes, it is possible for this modulus differential to reach the low end of this range presumably because the smaller microstructured elements do not undergo as great of shrinkage during curing.

In some embodiments, the microstructured elements (e.g., cube-corner) are preferably formed from a polymerizable resin capable of being crosslinked by a free radical polymerization mechanism by exposure to actinic radiation, for example, electron beam, ultraviolet light, or visible light. Alternatively or in addition to free radical polymerization, the polymerizable resin may be polymerized by thermal means with the addition of a thermal initiator such as benzoyl peroxide. Radiation-initiated cationically polymerizable resins also may be used.

The polymerizable resin composition comprises one or more polymerizable ethylenically unsaturated monomers, oligomers, prepolymers, or combination thereof. After curing, the ethylenically unsaturated components are reacted into a polymer. Preferred polymerizable compositions are 100% solids and substantially free of solvent.

The microstructured element composition may optionally comprise one or more reactive (e.g., ethylenically unsaturated) ingredients and/or one or more non-reactive ingredients. Various additives such as solvent, chain transfer agents, colorants (e.g., dyes), antioxidants, light stabilizers, UV absorbers, processing aids such as antiblocking agents, releasing agents, lubricants, and other additives may be added to the body portion or microstructured elements as described in U.S. Pat. No. 5,450,235 incorporated herein by reference.

When thermoplastic polymers are used in the microstructures (e.g., cube), the glass transition temperature generally is greater than 80° C., and the softening temperature is typically greater than 150° C. Generally, the thermoplastic polymers used in the microstructured layer are amorphous or semi-crystalline.

Examples of thermoplastic polymers that may be used in the microstructured elements include acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

Micro structured sheeting can be made according to a variety of known methods for making cube-corner sheeting such as described in U.S. Pat. Nos. 3,689,346; 3,811,983; 4,332,847; 4,601,861; 5,491,586; 5,642,222; and 5,691,846; incorporated herein by reference.

Microstructure articles, and in particular cube corner retroreflective sheeting, are commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae such as described in U.S. Pat. No. 7,188,960. In some embodiments, the elements have a shape in plan view selected from trapezoids, rectangles, parallelograms, pentagons, and hexagons.

U.S. Pat. Nos. 3,684,348 and 3,811,983 describe retroreflective material and a method of making a composite material wherein a fluid molding material is deposited on a molding surface having cube corner recesses and a preformed body member applied thereto. The molding material is then hardened and bonded to the body member. The molding material may be a molten resin and the solidification thereof accomplished at least in part by cooling, the inherent nature of the molten resin producing bonding to the body member thereof. Alternatively, the molding material may be fluid resin having cross-linkable groups and the solidification thereof may be accomplished at least in part by cross-linking of the resin. The molding material may also be a partially polymerized resin formulation and wherein the solidification thereof is accomplished at least in part by polymerization of the resin formulation.

The polymerizable resin may be poured or pumped directly into a dispenser that feeds a slot die apparatus. For embodiments wherein the polymer resin is a reactive resin, the method of manufacturing the sheeting further comprises curing the resin in one or more steps. For example the resin may be cured upon exposure to a suitable radiant energy source such as actinic radiation, ultraviolet light, visible light, etc. depending upon the nature of the polymerizable resin to sufficiently harden the resin prior to removal from the tool. Combinations of cooling and curing may also be employed.

Regardless of which method is employed to form the microreplicated (e.g., cube-corner elements), it is surmised that higher die force and/or temperature aids in the diffusion and dissolution of the gas that was formerly in the tool cavities into the thermoplastic or polymerizable resin before solidification of the resin. Carbon containing gases and gases with an atomic weight less than $O_2$ can aid in the diffusion and dissolution of the gas formerly in the tool cavities during manufacturing.

Flexible cube-corner retroreflective sheetings of the invention can be made by: (a) forming a plurality of cube-corner elements from a light transmissible material; and (b)

securing a body layer to the plurality of cube-corner elements. In one embodiment, the method generally comprises providing a (e.g., heated) electroplated nickel tool having a molding surface with a plurality of cavities suitable for forming desired microstructure elements (e.g., cube corner elements of a retroreflective article) and applying to the molding surface a flowable (e.g., curable) resin composition in amount sufficient to at least fill the cavities. The (exposed substantially planar) resin composition surface is then contacted with a body layer film followed by curing the resin to form a composite sheeting comprising an array of microstructure elements (e.g., cube corner elements) bonded to the overlay film. The composite sheeting is removed from the tool followed by applying mechanical stress to the sheeting so as to cause a fractured separation of substantially each individual microstructure element from surrounding microstructure elements, if they were connected by a land. Alternatively, the sheeting may be fractured such that a plurality of cube corner segments are formed, each segment comprising two or more cube corner elements. (See for example U.S. Pat. No. 6,318,867.)

Because of temperatures at which the microstructures are formed during manufacturing, a linear, short-chain-length polyurethane film as the body layer is likely to have a cross-over temperature too low and will therefore soften and even flow during application to the optically active element layer. However, use of highly crosslinked thermoset polyurethane films are undesirable because they are too stiff and rigid. The disclosed branched aliphatic thermoplastic polyurethane film for the body layer have a higher cross-over temperature and are able to withstand higher temperatures during processing without softening and flowing as compared to linear, short-chain-length thermoplastic polyurethanes. Also, the disclosed aliphatic thermoplastic polyurethane film is not so highly crosslinked to be considered a thermoset material, and therefore remains flexible.

In embodiments having a seal film, such as shown in FIG. 5, the seal film comprises a thermoplastic material. Such materials lend themselves well to fusing via relatively simple and commonly available thermal techniques. In one embodiment, the sealing layer comprises the aliphatic thermoplastic polyurethane, described below. In other examples suitable thermoplastic materials include ionomeric ethylene copolymers, plasticized vinyl halide polymers, acid functional polyethylene copolymers, aliphatic polyurethanes, aromatic polyurethanes, and combinations thereof. In some embodiments, the sealing layer comprises a copolymer or terpolymers of ethylene and at least one comonomer selected from vinyl acetate, alkyl (meth)acrylate, and mixtures thereof, as described in U.S. Pat. No. 7,611,251, incorporated herein by reference. In certain applications, this optional sealing layer can provide significant protection for the microstructured elements from environmental effects, as well as maintaining a sealed air layer around the microstructured elements which is essential for creating the refractive index differential needed for total internal reflection.

The light directing article 10 may be a thin film of sheeting that has a width bound by longitudinal edges. In one embodiment, the sheeting may be provided in a roll.

For a light directing article that is a retroreflective sheeting, the retroreflective sheeting is useful for a variety of uses such as traffic signs, pavement markings, vehicle markings and personal safety articles, in view of its flexibility in combination with retroreflected brightness. The coefficient of retroreflection, $R_A$, may be measured according to US Federal Test Method Standard 370 at −4° entrance, 0° orientation, at various observation angles. Retroreflective sheeting typically has a coefficient of retroreflection, $R_A$, at −4° entrance, 0° orientation, and an observation angle of 0.2° of at least 50, 100, 150, 200, or 250 candelas/lux/dm².

For a light directing article that is not retroreflective but light directing and therefore controlling the direction of light passing through the sheeting, the sheeting is useful for example to cover windows, or electronic displays.

Due to the flexibility of the sheeting, the sheeting is amendable for application to flexible substrates such as canvas and other fabrics, corrugated or riveted surfaces, as well as curved surfaces having a simple or compound curve. The flexible retroreflective sheeting is also amenable for application to devices subject to thermal expansion and contraction (e.g., traffic devices such as barrels, cones).

Typically, the exposed outer surface of a light directing article contains a protective layer. If the optically active elements are damaged from impact, wear, or weathering, then the function of the light directing article is reduced or destroyed. The disclosed body layer (i.e., protective layer) comprises an aliphatic thermoplastic polyurethane with a cross-over temperature greater than 110° C. In one embodiment, the cross-over temperature is greater than 130° C. In one embodiment, the cross-over temperature is less than 170° C. Particular polyols and polyisocyanates are reacted to form the aliphatic thermoplastic polyurethane with the defined cross-over temperature to provide durable and flexible films with good high temperature properties.

The aliphatic thermoplastic polyurethane layer is synthesized by polymerizing a polyol and a polyisocyanate. Typically, the aliphatic thermoplastic polyurethane layer is "branched" wherein the polyurethane is not a highly crosslinked thermoset polyurethane.

The molar amount of isocyanate groups is chosen to generally match the molar amount of hydroxyl groups from the polyols. The molar ratio of isocyanate groups to hydroxyl groups is defined as the isocyanate index. In some embodiments, the isocyanate index is between 0.90 and 1.10, and in some embodiments, the isocyanate index is between 0.95 and 1.05, and in some embodiments, the isocyanate index is between 1.00 and 1.05, and in some embodiments, the isocyanate index is between 1.00 and 1.03. The isocyanate index can be greater than 1.00 to account for impurities that may adversely affect the urethane polymerization.

To facilitate the reaction and branching, the polymerization reaction further comprises either a multifunctional polyol or the polyisocyanate is a multifunctional isocyanate. In one embodiment, the polyol is a diol and the polyisocyanate is a multifunctional isocyanate. In one embodiment, the polyol comprises both a diol and a multifunctional polyol and the polyisocyanate is a diisocyanate. In one embodiment, the reaction further comprises both a multifunctional polyol and a multifunctional isocyanate. In one embodiment, the polyol comprises a long chain polyol and a short chain polyol.

Long chain polyols used in polyurethane synthesis include, for example, polyester polyols, polycarbonate polyols, and combinations thereof. Examples of suitable polyols include materials commercially available under the trade designation DESMOPHEN from Bayer Corporation (Pittsburgh, Pa.). The polyols can be polyester polyols (for example, DESMOPHEN 63 IA, 650A, 65 IA, 670A, 680, 110, and 1150); polyether polyols (for example, DESMOPHEN 550U, 1600U, 1900U, and 1950U); or acrylic polyols (for example, DEMOPHEN A 160SN, A575, and A450BA/A); polycaprolactone polyols such as, for example, caprolactone polyols available under the trade designation CAPA from Solvay (Warrington, Cheshire, United Kingdom) (for example, CAPA 2043, 2054, 2100, 2121, 2200, 2201, 2200A, 2200D, 2100A); polycarbonate polyols (for example, polycarbonate polyols available under the trade designations PC-1122, PC-1167, and PC-1733 from Picassian Polymers (Boston, Mass.) or under the trade designation DESMOPHEN 2020E from Bayer Corp.); and combinations thereof.

Of the above, certain aliphatic polyol species were observed to provide particular advantageous properties, including solvent resistance, stain resistance, self-healing, and resistance to yellowing when exposed to ultraviolet and visible light over long periods of time. These species include aliphatic polyester polyols, polycaprolactone polyols, polycarbonate polyols, polyether polyols, polyolefin polyols, along with copolymers and mixtures thereof.

Examples of short chain polyols include a range of aliphatic diols, polyetherdiols, and alcohol-functional amines. Examples of short-chain aliphatic diols include ethylene glycol, propylene glycol, butanediol, pentanediol, hexanediol, heptanediol, octanediol, nonanediol, and decanediol. Short-chain diols can also include branched aliphatic diols, such as trimethylhexane diol, hexylene glycol, neopentyl glycol, methylpropanediol, and others. Aliphatic diols can also be cyclic in nature, such as 1,4-cyclohexanedimethanol. Examples of short-chain polyetherdiols include diethylene glycol, triethylene glycol, dipropylene glycol, or dibutylene glycol. An example of an alcohol-functional amine includes methyldiethanolamine.

Multifunctional polyols can be either short- or long-chain in nature. Examples of short-chain multifunctional polyols include glycerol, trimethylolpropane, 1,2,6-hexanetriol, 1,2,4-butanetriol, and triethanolamine. Examples of long-chain multifunctional polyols include tri-functional polycaprolactones, available from Solvay Corporation under the tradename CAPA, including CAPA 3031, 3051, and 3091; tri-functional polyether polyols, available under the tradename Carpol from Carpenter Corporation, including Carpol GP-240, GP-700, and GP-5000, among others; or branched polyester polyols with a functionality of greater than 2, available from Bayer Corp. under the tradename Desmophen.

Aliphatic diisocyanates include, for example, for example, 1,4-diisocyanatobutane; 1,6-diisocyanatohexane; 1,12-diisocyanatododecane; and 2-methyl-1,5-diisocyanatopentane. Aliphatic diisocyanates can also be cyclical in nature, for example methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate. They may further be polymeric or oligomeric compounds (for example, polyoxyalkylene, polyester, polybutadienyl, and the like) terminated by two isocyanate functional groups. Aliphatic diisocyanates were generally observed to provide superior weatherability compared with their aromatic counterparts. Particularly preferred species include dicyclohexylmethane diisocyanate, isophorone diisocyanate, hexamethylene diisocyanate, trimethylhexamethylene diisocyanate, along with copolymers and mixtures thereof.

Multifunctional isocyanates can include oligomers of diisocyanates, including the oligomers of hexamethylene diisocyanate, methylenedicyclohexylene-4,4'-diisocyanate; and 3-isocyanatomethyl-3,5,5-trimethylcyclohexyl isocyanate. In some embodiments, the oligomers can include isocyanurate groups, allophanate groups, uretonimine groups, and uretdione groups. Multifunctional isocyanates are commercially available under the trade designation MONDUR or DESMODUR (for example, DESMODUR XP7100 and DESMODUR N 3300) from Bayer Corporation (Pittsburgh, Pa.).

The aliphatic thermoplastic polyurethane is branched. To facilitate branching of the polyol and polyisocyanate, the reaction further comprises either a multifunctional polyol or the polyisocyanate is a multifunctional isocyanate. Functionalities greater than 2 produce branches in the polymeric chains and can lead to higher molecular weights than can be achieved with purely difunctional systems. However, at high levels of multifunctional polyol or multifunctional isocyanate, the majority of the resulting polymer will form a gel. A gel is a network of chains forming a single molecule of near infinite molecular weight. Preferably, lower levels of multifunctional polyol or multifunctional isocyanate are used such that much of the resulting polymer does not form a gel. This lack of gel formation allows the polyurethane material to be reprocessed at elevated temperatures, such as temperatures below 200° C. or below 190° C., or below 180° C. or below 170° C. The branched aliphatic thermoplastic polyurethane, then, is preferably not a thermoset material. The branching of the aliphatic thermoplastic is preferably within a range such that the molecular weight is greater than that of a purely difunctional system, while still being low enough to produce little or no gel formation. In systems with multifunctional monomers, the theoretical molecular weight can be determined using a set of equations described in *Macromolecules* (9), 1976, p 199-206. Equation 39 in that reference calculates the expected weight-average molecular weight ($M_W$) for a polymerization system such as the branched thermoplastic polyurethanes herein. In some embodiments, the expected weight average $M_W$ for the polyurethanes is greater than 30,000 g/mol or greater than 40,000 g/mol or greater than 70,000 g/mol, or greater than 100,000 g/mol, or greater than 200,000 g/mol, or greater than 300,000 g/mol. In practice, the actual experimental molecular weight may vary from the expected molecular weight, in part, due to impurities or side reactions. The actual molecular weights can be determined by gel permeation chromatography (GPC).

The branched aliphatic polyurethanes have little or no gel content to allow for processing at elevated temperature. Equation 39 in *Macromolecules* (9), 1976, p 206-211 can be used to calculate the theoretical non-gel and gel contents of a polymerization system containing reactive groups with multiple functionalities and a stoichiometric imbalance. In some embodiments, the theoretical gel content is less than 95%, or less than 90%, or less than 75%, or less than 50%. In practice, the actual measured gel content can vary from the theoretical gel content due to impurities or side reactions. In some embodiments, the experimentally measured gel content is less than 90%, or less than 75%, or less than 50%, or less than 25%.

In one embodiment, the percent of multifunctional groups, or the molar fraction of urethane groups derived from multifunctional monomers is between 0.25% and 5%, or between 0.5% and 3%. In some cases, the appropriate level of multifunctional monomer can depend on the stoichiometric imbalance, which is related to the isocyanate index. With a greater stoichiometric imbalance, more multifunctional monomer is needed to provide high molecular weights. Conversely with a small stoichiometric imbalance, lower levels of multifunctional monomer are needed to avoid fully crosslinking the polyurethane and forming a thermoset. The stoichiometric imbalance can be defined as the isocyanate index minus one hundred percent when the isocyanate index is greater than one. When the isocyanate index is less than one, the stoichiometric imbalance can be defined as the reciprocal of the isocyanate index minus one. In one embodiment, the percent of multifunctional monomers is at least as great the value of the stoichiometric imbalance, but is less than the sum of the stoichiometric imbalance and 5%.

The linear polymeric chains of an aliphatic thermoplastic polyurethane generally contain long, low-polarity "soft segments" and shorter, high-polarity "hard segments." In some embodiments, the soft and hard segments are synthesized in a one-step reaction that includes a polyisocyanate, short-chain polyol, and long-chain polyol. Upon conversion, the polyisocyanate and short-chain polyol collectively form the hard segment, while the long-chain polyol alone forms the soft segment. At ambient conditions, the hard segments form crystalline or pseudo-crystalline regions in the microstructure of the polyurethane, accounting for its elasticity. The soft segments provide a continuous matrix that enables facile elongation of the polyurethane material. The soft segment portion may or may not be the majority phase of the polyurethane composition.

The long-chain polyol has a number average molecular weight significantly greater than that of the short-chain polyol. In some embodiments, for example, the long-chain diol has a number average molecular weight of at least 185 g/mol, at least 200 g/mol, at least 300 g/mol, at least 400 g/mol, 500 g/mol, at least 600 g/mol, at least 700 g/mol, at least 800 g/mol, at least 900 g/mol, or at least 950 g/mol.

In some embodiments, the thermoplastic polyurethane has a hard segment content of at least 50 percent, at least 51 percent, at least 52 percent, at least 53 percent, at least 54 percent, at least 55 percent, at least 56 percent, at least 57 percent, at least 58 percent, at least 59 percent, at least 60 percent, at least 61 percent, at least 62 percent, at least 63 percent, at least 64 percent, at least 65 percent, at least 66 percent, at least 67 percent, at least 68 percent, at least 69 percent, at least 70 percent relative to the overall weight of the thermoplastic polyurethane. In some embodiments, the thermoplastic polyurethane has a hard segment content of at most 80 percent, at most 75 percent, at most 74 percent, at most 73 percent, at most 72 percent, at most 71 percent, or at most 70 percent by weight, relative to the overall weight of the thermoplastic polyurethane.

The hard segment content can be calculated from the relative weights of the starting materials used in preparing the thermoplastic polyurethane. In the embodiments described herein, the hard segment content is determined using the following formula:

$$\text{Hard segment }(\%) = \frac{100\% \times [\text{wt. of (short-chain polyol + polyisocyanate)}]}{[\text{wt. of (polyol + polyisocyanate + additives)}]}$$

While the relative amounts of long-chain and short-chain polyol can vary over a wide range depending on the hardness desired, the overall relative amounts of polyisocyanate to polyol are generally selected to be nearly stoichiometric equivalent amounts. In some instances, it may be desired to use an excess of one component, such as polyol, to minimize unreacted remnant of the other component.

The kinetics of the polymerization between the polyisocyanate and polyol species is typically accelerated with the help of a suitable catalyst, including dibutyltin dilaurate, dibutyltin diacetate, stannous octoate, triethylene diamine, zirconium catalysts, zinc catalysts and bismuth catalysts.

The overall molecular weight of the aliphatic thermoplastic polyurethane after polymerization should be sufficiently high to provide high strength and elongation properties for thermoforming applications, yet not so high that melt processing of the polymer is unduly complicated. In exemplary embodiments, the aliphatic thermoplastic polyurethane can have a weight average molecular weight of at least 30,000 g/mol, at least 100,000 g/mol, at least 150,000 g/mol, at least 200,000 g/mol, at least 250,000 g/mol, at least 300,000 g/mol, at least 350,000 g/mol, or at least 400,000 g/mol. In exemplary embodiments, the aliphatic thermoplastic polyurethane can have a weight average molecular weight of at most 800,000 g/mol, at most 750,000 g/mol, at most 700,000 g/mol, at most 650,000 g/mol, or at most 600,000 g/mol.

In some embodiments, the aliphatic thermoplastic polyurethane has a substantially monomodal molecular weight distribution. Such a distribution can be achieved, for example, using the methods disclosed in U.S. Pat. No. 8,128,779 (Ho, et al.). The polydispersity index of the polyurethane, defined as the ratio between the weight average molecular weight and number average molecular weight, can be at least 1.1, at least 1.5, at least 2.0, at least 2.5 or at least 3.0. As to the same or alternative embodiments, the polydispersity index of the polyurethane can be at most 6.0, at most 5.7, at most 5.5, at most 5.2 or at most 5.0.

Exemplary embodiments of the polyurethane composition have thermostability at higher temperatures. For example, the disclosed aliphatic thermoplastic polyurethane compositions have a cross-over temperature that is greater than 110° C. In one embodiment, the aliphatic thermoplastic polyurethane composition has a cross-over temperature that is greater than 130° C. In one embodiment, the aliphatic thermoplastic polyurethane composition has a cross-over temperature that is greater than 140° C. In one embodiment, the aliphatic thermoplastic polyurethane composition has a cross over temperature that is less than 170° C.

It is desirable for the disclosed aliphatic thermoplastic polyurethane compositions to display a hardness that is sufficient to avoid or substantially reduce the degradation of its surface finish or damage to the underlying portion containing the optically active elements when subjected to harsh environmental conditions over extended periods of time. For example, for retroreflective sign material, the polyurethane composition should be hard enough to resist damage from exposure to outdoor conditions. In exemplary embodiments, the polyurethane film has a Shore D hardness of at least 50, at least 55, at least 60, at least 65, at least 70, at least 80, at least 85. In exemplary embodiment, the polyurethane film has a Shore D hardness of at most 85, at most 80, at most 70, at most 65, at most 60, at most 55, at most 50.

For the disclosed aliphatic thermoplastic polyurethanes to have the desired hardness, it can be desirable for the polyurethanes to have glass transition temperature above ambient temperature. For the disclosed aliphatic thermoplastic polyurethanes to have the desired flexibility and toughness, it can be desirable for the polyurethanes to have a glass transition temperature that is close to ambient temperature. To achieve a balance of hardness and toughness, in some embodiments, the glass transition temperature is between 35° C. and 70° C., or between 40° C. and 65° C. The glass transition temperature can be measured as the temperature corresponding to the peak of the tan delta signal in a dynamic mechanical analysis test.

Exemplary embodiments of the aliphatic thermoplastic polyurethane composition have mechanical properties enabling the protective polyurethane layer to be stretched over substrates having complex curvatures in three dimensions. Because of the variety of different substrates that could be encountered, it is desirable for the polyurethane composition to be capable of being stretched uniformly over a substantial distance without breaking. At 25 degrees Celsius, the aliphatic thermoplastic polyurethane composition optionally has an Elongation at Break test result (whose specifics shall be defined in the forthcoming Examples) of at least 140 percent, at least 145 percent, at least 150 percent, at least 155 percent, at least 160 percent, at least 165 percent, at least 170 percent, at least 175 percent, at least 180 percent, at least 185 percent, at least 190 percent, at least 200 percent, at least 205 percent, at least 210 percent, at least 215 percent, at least 220 percent, at least 225 percent, at least 230 percent, at least 235 percent, at least 240 percent, at least 245 percent, or at least 250 percent.

The aliphatic thermoplastic polyurethane layer may be formed using conventional techniques known to those of ordinary skill in the art. Such techniques include, for example, coating or extruding onto a substrate. One skilled in the art can coat or extrude the disclosed polyurethane compositions onto a substrate, such as the optical element layer of the light directing article using either batch or continuous techniques.

In a preferred method, an aliphatic thermoplastic polyurethane is formed by extruding it at an elevated temperature through an extrusion die. The thermoplastic polyurethane layer may also be formed by casting or otherwise molding (for example, injection molding) the thermoplastic polyurethane into the shape desired.

In some embodiments, it may be desirable to corona treat (using, for example, air or nitrogen), a major surface of an extruded aliphatic thermoplastic polyurethane prior to bonding the major surface to an adhesive layer or to the layer comprising the optical elements. Such treatment can improve adhesion between the polyurethane layer and the adjacent layers.

Although specific embodiments have been shown and described herein, it is understood that these embodiments are merely illustrative of many possible arrangements. Numerous and varied other arrangements can be devised by those of skill in the art without departing from the spirit and scope of the invention. Thus, the scope of the present invention should not be limited to the structures described in this application, but only by the structures described by the language of the claims and the equivalents of those structures. The figures may not be drawn to scale.

Features and advantages of this invention are further illustrated in the following examples. While the examples serve this purpose, the particular ingredients and amounts used as well as other conditions and details are not to be construed in a manner that would unduly limit the scope of this invention.

EXAMPLES

Test Methods:

Hard segment wt %: Hard segment weight percent (wt %) was calculated using equation (1), below, wherein wt means weight:

$$\text{Hard segment (\%)} = \frac{100\% \times [\text{wt. of (short-chain polyol} + \text{polyisocyanate)}]}{[\text{wt. of (polyol} + \text{polyisocyanate} + \text{additives})]} \quad (1)$$

Percent (%) multifunctional: The molar percent of urethane groups that are expected to be derived from monomers leading to crosslinking or branching was calculated using equation (2), below, wherein $EW_{mp}$, $EW_{mi}$, $EW_{sd}$ and $EW_{ld}$ mean equivalent weight, respectively, of multifunctional polyol, multifunctional isocyanate, short chain diol and long chain diol. $W_{mp}$, $W_{sd}$ and $W_{ld}$ mean the weight fraction, respectively, of multifunctional polyol, multifunctional isocyanate, short chain diol, and long chain diol:

$$\% \text{ multifunctional} = (W_{mp}/EW_{mp} + W_{mi}/EW_{mi})/(W_{mp}/EW_{mp} + W_{sd}/EW_{sd} + W_{ld}/EW_{ld}) \quad (2)$$

Theoretical Expected Gel Fraction: The theoretical gel fraction of the polymers can be calculated by the equation:

$$\text{gel fraction} = 1 - \text{weight fraction of soluble polymer}$$

The expected weight fraction of soluble polymer can be calculated using the method described in *Macromolecules*, Vol. 9, No. 2, pages 206-211 (1976). In this case, the soluble fraction can be calculated by equation 39 on page 208 of the *Macromolecules* reference. The solution to this equation requires that equation 21 from the same *Macromolecules* reference be solved numerically.

Shore D Hardness: Shore D hardness was measured using the procedure generally described in ASTM D2240-05, "Standard Test Method for Rubber Property—Durometer Hardness".

Cross-over temperature: cross-over temperature was calculated by performing dynamic mechanical analysis testing using a rheometer model "ARES" obtained from TA Instruments, of New Castle, Del. Samples were placed between 8 mm diameter parallel plates, wherein the thickness of each sample ranged from 0.5 to 3 mm. A shear oscillatory strain was applied at a frequency of 1 rad/sec in a temperature ramp experiment where the temperature was increased in 1° C. increments for the measurements. The torque and phase lag were measured from which the storage (G') and loss shear relaxation moduli (G") were calculated. The initial temperature for the test was well above room temperature, and about 10 to 30° C. lower than the point at which the material goes from rubbery (G'>G") to flow (G'<G") region. The cross-over point where G'=G", was noted and is reported as cross-over temperature. This temperature is directly related to the weight average molecular weight of the film. A desirable higher cross-over temperature corresponded to higher molecular weight, hence, better high temperature properties.

Glass Transition Temperature: The glass transition temperature was measured as the temperature corresponding to the tan DELTA maximum using dynamic mechanical analysis (DMA) testing in tensile mode. The film samples were cut into strips 6.2 mm wide. The strips were mounted in tensile grips of a Q800 Dynamic Mechanical Analyzer (available from TA Instruments, New Castle, Del.) with a test length between 16 mm and 20 mm. The samples were tested with an amplitude of 0.2% strain and a frequency of 1 Hz. The temperature was ramped from −20° C. to at least 80° C. at a rate of 2° C./min. The ratio (E"/E'), a unitless parameter typically denoted "tan DELTA", was plotted versus temperature. The temperature at which the tan DELTA signal reaches a maximum point (point where the slope was zero) in the transition region between the glassy region and the rubbery is defined as the Tg (glass transition temperature), and correlates with the Shore D hardness of the urethane films.

Tensile and Elongation measurements: Tensile and elongation tests were carried out following the procedure generally described in ASTM D882-12, "Standard Test Method for Tensile Properties of Thin Plastic Sheeting". Modulus (measured in psi) and percent strain at peak (%) are reported.

Impact testing: impact testing was carried out following the procedure generally described in ASTM D2794-93, "Standard Test Method for Resistance of Organic Coatings to the Effects of Rapid Deformation (Impact)". Samples of light directing articles were adhered to an aluminum substrate prior to testing. Probe diameter was 0.625 in (1.58 cm) and the highest impact was recorded.

Taber Abrasion: taber abrasion was carried out following the procedure described in ASTM D4060-10, "Standard Test Method for Abrasion Resistance of Organic Coatings by the Taber Abraser", and brightness (coefficient of retroreflection $R_A$) measurements were carried following the procedure describes in ASTM E810-03, "Standard Test Method for Coefficient of Retroreflection of Retroreflective Sheeting Utilizing the Coplanar Geometry". The initial 0.2/4 (observation angle/entrance angle) average brightness values (Initial $R_A$) were measured using a RM-2 retroluminometer. The sample was abraded using CS-10 wheels for 10 cycles. The load per wheel was 500 g total (250 g equipment and the weight was 250 gms). The 0.2/4 brightness was also measured after abrasion (Final $R_A$).

Heat stability: brightness measurements were carried out in accordance with ASTM E810-03. The initial 0.2/4 (observation angle/entrance angle) average values were measured using a RM-2 retroluminometer. The samples were heated to 250° F. for 15 minutes and another set of samples were heated to 300° F. for 15 minutes. The 0.2/4 brightness was measured after heat treatment.

Gel Fraction: Gel fraction measurements were performed based on a modification of the test method described in ASTM D2795-11. A piece of 316 stainless steel wire cloth (120×120 mesh, 38 mm×76 mm) was folded into a pouch approximately 25 mm on each side, and the pouch was weighed. The polyurethane film sample (between 0.15 g and 0.25 g) was placed in the pouch and weighed, and the pouch was suspended in refluxing tetrahydrofuran (THF) for 20 hours. The pouch and any remaining contents were removed from the THF and dried to constant weight. The gel content of the polyurethane was calculated based on the weight of material remaining in the pouch.

Materials

Materials used in the preparation of Examples 1-9 and Comparative Examples A-C are shown below, wherein Mw refers to molecular weight; Eq refers to equivalent weight; and OH # refers to hydroxyl number.

| Trade Designation/ Chemical Name | Description | Supplier |
|---|---|---|
| FOMREZ 44-111 | Polyester polyol having an Mw of 1000, functionality of 2, Eq of 500 and OH# 112.2 | Chemtura, Middlebury, CT |
| 1,4-butane diol | Chain extender diol having an Mw of 90, functionality of 2, Eq of 45 and OH# of 1246.7 | Lyondell Chemical Company |
| Glycerol | Trifunctional polyol having an Mw of 92, functionality of 3, Eq of 30.7 and an OH# of 1827.4 | EMD Chemicals, Gibbstown, NJ |
| DESMODUR W | Hydrogenated methylene diphenyl isocyanate (H12MDI) having an Mw of 262, functionality of 2 and Eq of 131. | Bayer, Pittsburgh, PA |
| DESMODUR N3300 | Multifunctional isocyanate having an Mw of 680, functionality of 3.4 and Eq of 200. | Bayer |
| TINUVIN 292 | Liquid hindered amine light stabilizer | BASF, Florham Park, NJ |
| TINUVIN 571 | Benzotriazole. Ultraviolet absorber (UVA) | BASF |
| TINUVIN 479 | Triazine-based UV absorber. | BASF |
| T-12 | Dibutyl dilaurate, catalyst. | PMC Organometallix, Mount Laurel, NJ |
| TECOFLEX TPU EG-93A | Aliphatic polyester-based polyurethane having a Shore hardness of 87A (36D) and molecular weight of 80,000. Measured cross-over temperature of 85 C. | Lubrizol, Wickliffe, OH |
| EBECRYL 3720 | Bisphenol A epoxy diacrylate | Cytec Industries |
| TMPTA | Trimethylol propane triacrylate | Allnex, Smyrna, GA |
| HDDA | Hexanediol diacrylate | Sartomer, Exton, PA |
| TPO | 2,4,6-trimethylbenzoyl diphenylphosphine oxide | BASF |
| DAROCUR 1173 | 2-hydroxy-2,2-dimethyl phenyl propane-1-one | BASF |

Body Layers 1-9 and Comparative Body Layer A

Body layers comprising thermoplastic urethanes were prepared by reactively extruding Part A (polyols) and Part B (isocyanates) in a co-rotating twin screw extruder as generally described in Example 1 of U.S. Pat. No. 8,128,779, the disclosure of which is incorporated herein by reference in its entirety.

Part A typically comprised polyols and other additives, such as, for example, catalysts, hindered-amine light stabilizers (HALS) and UV absorbers. Glycerol imparted a degree of branching to the polyurethane and body layers which included glycerol are also referred to as "branched thermoplastic polyurethanes".

Ingredients are shown as a weight percent based on the total composition in Table 1, below. After the polymerization reaction was complete, films were extruded from a die at a thickness of 2.5 mils (60 microns) onto a PET (polyethylene terephthalate) carrier film.

TABLE 1

|  | Ingredients | Body Layer 1 | Body Layer 2 | Body Layer 3 | Body Layer 4 | Body Layer 5 | Body Layer 6 | Body Layer 7 | Body Layer 8 | Body Layer 9 | Comp. Body Layer A |
|---|---|---|---|---|---|---|---|---|---|---|---|
| PART A | FOMREZ 44-111 | 39.4% | 39.3% | 39.2% | 35.5% | 35.4% | 34.8% | 31.5% | 31.5% | 31.5% | 31.5% |
|  | 1,4 butane diol | 11.1% | 11.0% | 10.9% | 12.9% | 12.8% | 12.9% | 14.2% | 14.1% | 13.9% | 14.4% |
|  | Glycerol | 0.0% | 0.1% | 0.2% | 0.0% | 0.1% | 0.0% | 0.0% | 0.1% | 0.2% | 0.2% |
|  | TINUVIN 292 | 2.0% | 2.1% | 2.1% | 2.0% | 2.0% | 1.9% | 2.0% | 2.0% | 2.0% | 2.0% |
|  | TINUVIN 571 | 3.0% | 3.1% | 3.2% | 0.0% | 0.0% | 0.0% | 0.0% | 0.0% | 0.0% | 0.0% |
|  | TINUVIN 479 | 0.0% | 0.0% | 0.0% | 3.0% | 3.0% | 2.9% | 3.0% | 3.0% | 3.0% | 3.0% |
|  | T-12 | 0.1% | 0.1% | 0.1% | 0.1% | 0.1% | 0.1% | 0.1% | 0.1% | 0.1% | 0.1% |
| PART B | DESMODUR W | 44.4% | 44.4% | 44.3% | 46.5% | 46.6% | 46.0% | 49.2% | 49.2% | 49.3% | 48.7% |
|  | DESMODUR N3300 | 0.0% | 0.0% | 0.0% | 0.0% | 0.0% | 1.4% | 0.0% | 0.0% | 0.0% | 0.0% |

Properties of Body Layers 1-9 and Comparative Body Layer A were calculated or measured as described in Test Methods above, and are shown in Table 2 and 3, below.

TABLE 2

| Properties of Body Layer | NCO/OH isocyanate index | Hard segment wt % | Shore Hardness | % Multifunctional | Theoretical Expected Gel Fraction | Theoretical Expected $M_W$ |
|---|---|---|---|---|---|---|
| Body Layer 1 | 1.04 | 55.5 | 60D | 0 | 0% | 29,000 |
| Body Layer 2 | 1.04 | 55.5 | 60D | 0.01 | 0% | 43,000 |
| Body Layer 3 | 1.04 | 55.4 | 60D | 0.02 | 0% | 86,000 |
| Body Layer 4 | 0.99 | 59.5 | 70D | 0 | 0% | 106,000 |
| Body Layer 5 | 0.99 | 59.5 | 70D | 0.01 | 35% | Part Gel |
| Body Layer 6 | 1.00 | 60.3 | 75D | 0.02 | 1% | Part Gel |
| Body Layer 7 | 0.99 | 63.4 | 80D | 0 | 0% | 128,000 |
| Body Layer 8 | 0.99 | 63.4 | 80D | 0.01 | 0% | 478,000 |
| Body Layer 9 | 0.99 | 63.4 | 80D | 0.02 | 90% | Part Gel |
| Comparative Body Layer A | 0.95 | 63.3 | 80D | 0 | 0% | 33,000 |

Examples 1-9 and Comparative Example A

Light directing articles of Examples 1-9 and Comparative Example A were prepared using, respectively, Body Layers 1-9 and Comparative Body Layer A. A plurality of optically active elements, specifically, microreplicated cube corner structures were provided on a body layer as generally described in U.S. Pat. No. 5,691,846, the disclosure of which is incorporated herein by reference in its entirety. The cube corner structure (prior to separating the structure into individual cubes) had 3 sets of intersecting grooves as having a pitch (i.e., primary groove spacing) of 0.004″ with base triangle apertures of 58/58/64 degrees resulting in the height of the cube corner elements being 50.0 microns (2 mils).

The cube corner structures were formed using a resin prepared by combining 25 wt-% bisphenol A epoxy diacrylate, commercially available under the trade designation "Ebecryl 3720", 50 wt-% TMPTA (trimethylol propane triacrylate) and 25 wt-% 1,6 HDDA (hexanediol diacrylate). The formulation had 0.5 pph of TPO (2,4,6-trimethylbenzoyl diphenylphosphine oxide) photoinitiator and 0.5 pph of Darocure 1173 (2-hydroxy-2,2-dimethyl phenyl propane-1-one).

The urethane body layer and PET carrier film then contacted the cube corner structures on a metal tool that was heated to 170° F. via a rubber nip roller having a gap set to minimize the amount of resin composition applied over the cavities of the tool. The resin of the cube corner structures was cured through the body layer and carrier film with two Fusion D UV lamps (available from Fusion Systems, Rockville, Md.) set at 360 and 600 W/in respectively. Dichroic filters were used in front of the UV lamps to minimize IR heating of the construction. Upon completion of the microreplication process and removal from the tool, the polymerizable resin side of the composite with the cube corner elements was irradiated by a Fusion D UV lamp operating at 75% to provide a post-UV irradiation cure. The construction was passed through an oven set at 170° F. to relax the stresses in the film.

The light directing article was then sealed using a seal film prepared as described in U.S. Patent Publication No. 2013/0034682, the disclosure of which is incorporated herein by reference in its entirety, except that a (1) flexographic printer was used to print the UVA curable ink on the adhesive layer, and (2) the printed pattern comprised 420 micron squares and a gap of 180 micro, for a total coverage of 49%.

Comparative Example B

A light directing article was obtained under the trade designation "High Definition License Plate" retroreflective sheeting from 3M Company, of St. Paul, Minn., and is hereinafter referred to as Comparative Example B. This light directing article comprised a vinyl-based body layer having a shore hardness of 45D.

Comparative Example C

A light directing article was prepared as generally described in Examples 1-9 and Comparative Example A, except that the body layer was an aliphatic polyester-based thermoplastic polyurethane film having a Shore A hardness of 87 and prepared from commercially available TECOFLEX TPU EG-93A from Lubrizol.

Light directing articles of Examples 1-9 and Comparative Examples A-C were tested using the procedures describes above. Results are reported in Tables 3-5, below, wherein N/M means the property was not measured.

TABLE 3

| Example | Shore hardness | Cross-over temp of (° C.) | Tg Temp. at tan DELTA max. (° C.) | Modulus (MPa) | % strain at peak |
|---|---|---|---|---|---|
| Example 1 | 60D | 117 | 39 | 117 | 265 |
| Example 2 | 60D | 146 | 41 | 141 | 281 |
| Example 3 | 60D | 153 | 40 | 134 | 263 |
| Example 4 | 70D | 116 | 52 | 263 | 208 |
| Example 5 | 70D | 128 | 51 | 277 | 215 |
| Example 6 | 75D | 162 | 52 | 405 | 229 |
| Example 7 | 80D | 116 | 57 | 731 | 206 |
| Example 8 | 80D | 148 | 56 | 779 | 225 |

TABLE 3-continued

| Example | Shore hardness | Cross-over temp of (° C.) | Tg Temp. at tan DELTA max. (° C.) | Modulus (MPa) | % strain at peak |
|---|---|---|---|---|---|
| Example 9 | 80D | 156 | 56 | 910 | 228 |
| Comp. Example A | 80D | 70 | 56 | 470 | 194 |
| Comp. Example B | 45D | N/M | N/M | 226 | 160 |
| Comp. Example C | 87A (36D) | 85 | 30 | 33 | 250 |

Taber abrasion was performed as described above. Initial brightness (Initial $R_A$) and brightness after the abrasion test (Final $R_A$) were measured. Percent brightness retention (%) was calculated and is also reported. Results are shown in Table 4, below.

TABLE 4

| | | Taber Abrasion | | |
|---|---|---|---|---|
| Example | Impact (kg-m) | Initial $R_A$ 0.2/4 (cd/lux · m²) | Final $R_A$ 0.2/4 (cd/lux · m²) | % Retention |
| Example 1 | 1.38 | 250 | 247 | 99% |
| Example 2 | 1.36 | 269 | 266 | 99% |
| Example 3 | 1.47 | 288 | 293 | 102% |
| Example 4 | 1.12 | 298 | 242 | 81% |
| Example 5 | 1.21 | 311 | 275 | 88% |
| Example 6 | 0.97 | 406 | 376 | 93% |
| Example 7 | 0.89 | 320 | 146 | 46% |
| Example 8 | 0.81 | 345 | 157 | 46% |
| Example 9 | 0.79 | 356 | 158 | 44% |
| Comp. Example A | 0.67 | 313 | 153 | 49% |
| Comp. Example B | 0.45 | 202 | 61 | 30% |
| Comp. Example C | N/M | N/M | N/M | N/M |

Heat stability of the light directing articles was measured after they were submitted to a temperature of about 250° F. (121° C.) and about 300° F. (149° C.). Initial brightness (Initial $R_A$) was measured as well as brightness after the samples were heated (Final $R_A$). Percent brightness retention (%) was calculated and is also reported. Results are shown in Table 5, below.

TABLE 5

| | After 250° F. for 15 minutes | | | After 300° F. for 15 minutes | | |
|---|---|---|---|---|---|---|
| Examples | Initial $R_A$ 0.2/4 (cd/lux · m²) | Final $R_A$ 0.2/4 (cd/lux · m²) | % Retention | Initial $R_A$ 0.2/4 (cd/lux · m²) | Final $R_A$ 0.2/4 (cd/lux · m²) | % Retention |
| Example 1 | 274 | 213 | 78% | 261 | 181 | 69% |
| Example 2 | 260 | 250 | 96% | 264 | 204 | 77% |
| Example 3 | 258 | 244 | 95% | 276 | 219 | 79% |
| Example 4 | 338 | 285 | 84% | 338 | 207 | 61% |
| Example 5 | 323 | 296 | 92% | 323 | 224 | 69% |
| Example 6 | 315 | 292 | 93% | 315 | 233 | 74% |
| Example 7 | 368 | 285 | 77% | 368 | 224 | 61% |
| Example 8 | 349 | 311 | 89% | 349 | 238 | 68% |
| Example 9 | 372 | 349 | 94% | 372 | 271 | 73% |
| Comp. Example A | 377 | 149 | 40% | 377 | 102 | 27% |
| Comp. Example B | 204 | 218 | 107% | 209 | 213 | 102% |
| Comp. Example C | 221 | 142 | 64% | 206 | 101 | 49% |

What is claimed is:

1. A light directing article comprising:
a plurality of optically active elements; and
a body layer adjacent to the plurality of optically active elements;
wherein the body layer comprises an aliphatic thermoplastic polyurethane that has a cross-over temperature greater than 110° C. and less than 170° C. and a glass transition temperature (Tg) greater than 35° C. and less than 70° C., and
wherein the aliphatic thermoplastic polyurethane is the reaction product of a short chain polyol, a long chain polyol, multifunctional polyol and a diisocyanate.

2. The light directing article of claim 1 wherein the optically active elements comprise beads or microstructured elements, wherein the microstructured elements are either (i) the reaction product of a polymerizable resin or (ii) solidified thermoplastic resin.

3. The light directing article of claim 1, wherein the microstructured elements are longitudinally extending prisms or cube-corner elements.

4. The light directing article of claim 1, comprising an adhesion promoting surface treatment between the major surface and the body layer, adhesion promoting surface treatment selected from a prime layer, corona treatment, or a combination thereof.

5. The light directing article of claim 1, wherein the aliphatic thermoplastic polyurethane has a light transmissibility of at least 70 percent of the intensity of the light incident.

6. The light directing article of claim 1, wherein the aliphatic thermoplastic polyurethane is branched.

7. The light directing article of claim 1, wherein the branched aliphatic thermoplastic polyurethane comprise a block structure comprising a hard segment covalently bonded to a soft segment.

8. The light directing article of claim 1, wherein the branched aliphatic thermoplastic polyurethane has a hard segment content ranging from 50 percent to 75 percent by weight.

9. The light directing article of claim 1, where in the long chain polyol has a molecular weight greater than 185 g/mol.

10. The light directing article claim 1, wherein the long chain polyol is selected from the group consisting of: aliphatic polyester polyols, polycaprolactone polyols, polycarbonate polyols, polyether polyols, polyolefin polyols, and copolymers and mixtures thereof.

11. The light directing article of claim 1, where in the short chain polyol has a molecular weight less than 185 g/mol.

12. The light directing article of claim 1, wherein the short chain polyol is selected from the group consisting of: butanediols, hexanediol, cyclohexane dimethanol, and copolymers and mixtures thereof.

13. The light directing article of claim 1, wherein the multifunctional polyol is selected from the group consisting of: trifunctional glycerol, trimethylolpropane, 1,2,6-hexanetriol, 1,2,4-butanetriol, and triethanolamine, and copolymers and mixtures thereof.

14. The light directing article of claim 1, wherein the diisocyanate is selected from the group consisting of: dicyclohexylmethane diisocyanate, isophorone diisocyanate, hexamethylene diisocyanate, trimethylhexamethylene diisocyanate, and copolymers and mixtures thereof.

15. The light directing article of claim 1, wherein the aliphatic thermoplastic polyurethane has a Shore D hardness of at least 50 and less than 85, a weight average molecular weight ranging from 30,000 g/mol to 800,000 g/mol, a glass transition temperature that is greater than 35° C. and less than 70° C., and a cross-over temperature of at least 110° C.

* * * * *

UNITED STATES PATENT AND TRADEMARK OFFICE
CERTIFICATE OF CORRECTION

| | | |
|---|---|---|
| PATENT NO. | : 11,567,239 B2 | Page 1 of 1 |
| APPLICATION NO. | : 17/114821 | |
| DATED | : January 31, 2023 | |
| INVENTOR(S) | : Thakkar et al. | |

It is certified that error appears in the above-identified patent and that said Letters Patent is hereby corrected as shown below:

In the Claims

<u>Column 22</u>
Line 47, In Claim 7, delete "comprise" and insert -- comprises --, therefor.

Signed and Sealed this
Seventh Day of November, 2023

Katherine Kelly Vidal
*Director of the United States Patent and Trademark Office*